(12) United States Patent
Thanigachalam et al.

(10) Patent No.: US 8,806,964 B2
(45) Date of Patent: Aug. 19, 2014

(54) FORCE SENSOR

(75) Inventors: Palani Thanigachalam, Bangalore (IN); Todd Eckhardt, Westerville, OH (US); Richard Wade, Worthington, OH (US)

(73) Assignee: Honeywell International Inc., Morristown, NJ (US)

( * ) Notice: Subject to any disclaimer, the term of this patent is extended or adjusted under 35 U.S.C. 154(b) by 155 days.

(21) Appl. No.: 13/429,272

(22) Filed: Mar. 23, 2012

(65) Prior Publication Data

US 2013/0247689 A1  Sep. 26, 2013

(51) Int. Cl.
*G01L 1/04* (2006.01)

(52) U.S. Cl.
USPC .................................. 73/862.627

(58) Field of Classification Search
USPC .................................. 73/862.627
See application file for complete search history.

(56) References Cited

U.S. PATENT DOCUMENTS

| | | | |
|---|---|---|---|
| 1,972,578 A * | 9/1934 | Wallichs et al. | 338/47 |
| 4,155,325 A | 5/1979 | Yu | |
| 4,265,164 A | 5/1981 | Maeda et al. | |
| 4,645,965 A | 2/1987 | Paganelli | |
| 4,790,192 A * | 12/1988 | Knecht et al. | 73/721 |
| 5,165,289 A | 11/1992 | Tilmans | |
| 5,184,107 A | 2/1993 | Maurer | |
| 5,187,985 A | 2/1993 | Nelson | |
| 5,223,776 A | 6/1993 | Radke et al. | |
| 5,303,593 A | 4/1994 | Kremidas | |
| 5,333,504 A | 8/1994 | Lutz et al. | |
| 5,357,808 A | 10/1994 | Fung et al. | |
| 5,438,875 A | 8/1995 | Fung et al. | |
| 5,499,041 A | 3/1996 | Brandenburg et al. | |
| 5,587,601 A | 12/1996 | Kurtz | |
| 5,661,245 A | 8/1997 | Svoboda et al. | |
| 5,744,726 A | 4/1998 | Maurer | |
| 5,760,313 A | 6/1998 | Guentner et al. | |
| 5,996,419 A | 12/1999 | Sokn | |
| 5,999,084 A | 12/1999 | Armstrong | |

(Continued)

FOREIGN PATENT DOCUMENTS

| | | |
|---|---|---|
| EP | 0091282 A2 | 10/1983 |
| EP | 0354366 B1 | 11/1992 |

(Continued)

OTHER PUBLICATIONS http://www.digikey.com/catalog/en/partgroup/fsg-series-force-sensor/23592?print=1, "FSG Series Force Sensor", Sensing and Control, 1 page, printed Aug. 1, 2012.

(Continued)

*Primary Examiner* — Lisa Caputo
*Assistant Examiner* — Octavia D. Hollington
(74) *Attorney, Agent, or Firm* — Seager Tufte Wickhem LLC

(57) ABSTRACT

A force sensor may include a sense die mounted to a substrate and an actuating assembly for transmitting an external force to the sense die. The sense die may include a diaphragm, a boss extending from the diaphragm, and one or more sensing elements (e.g., piezoresistive elements positioned on the diaphragm). The actuation assembly may include a force receiving feature configured to receive an external force at a first end and transfer at least a portion of the received external force through a second end to the diaphragm via intimate contact with a bottom side of the boss. In some cases, the force sensor may also include signal conditioning circuitry.

23 Claims, 15 Drawing Sheets

(56) References Cited

U.S. PATENT DOCUMENTS

| | | |
|---|---|---|
| 6,255,728 B1 | 7/2001 | Nasiri et al. |
| 6,311,561 B1 | 11/2001 | Bang et al. |
| 6,343,991 B1 | 2/2002 | Armstrong |
| 6,351,996 B1 | 3/2002 | Nasiri et al. |
| 6,481,286 B1 | 11/2002 | Bernstein et al. |
| 6,489,668 B1 | 12/2002 | Oda et al. |
| 6,601,455 B2 | 8/2003 | Kurtz et al. |
| 6,705,166 B2 | 3/2004 | Leonardson |
| 6,712,778 B1 | 3/2004 | Jeffcoat et al. |
| 6,736,015 B1 | 5/2004 | Repperberger et al. |
| 6,778,916 B2 | 8/2004 | Lee |
| 6,813,956 B2 | 11/2004 | Kurtz et al. |
| 6,874,377 B2 | 4/2005 | Karbassi et al. |
| 6,907,789 B2 | 6/2005 | Bodin |
| 6,931,937 B1 * | 8/2005 | Tanaka et al. ............... 73/753 |
| 7,099,652 B2 | 8/2006 | Brown et al. |
| 7,287,432 B2 | 10/2007 | Schnaare et al. |
| 7,290,453 B2 | 11/2007 | Brosh |
| 7,360,438 B2 | 4/2008 | Gaines |
| 7,360,440 B2 * | 4/2008 | Hirose et al. ............... 73/777 |
| 7,404,338 B2 | 7/2008 | Hierold et al. |
| 7,462,919 B2 | 12/2008 | Engling et al. |
| 7,503,221 B2 | 3/2009 | Wade |
| 7,554,167 B2 | 6/2009 | Vaganov |
| 7,726,197 B2 * | 6/2010 | Selvan et al. ............... 73/777 |
| 7,772,657 B2 * | 8/2010 | Vaganov ............... 257/415 |
| 7,775,126 B2 | 8/2010 | Eckhardt et al. |
| 7,775,127 B2 | 8/2010 | Wade |
| 7,791,151 B2 | 9/2010 | Vaganov et al. |
| 7,880,247 B2 | 2/2011 | Vaganov et al. |
| 8,004,052 B2 | 8/2011 | Vaganov |
| 8,024,978 B2 | 9/2011 | Khemet et al. |
| 8,091,436 B2 | 1/2012 | Eckhardt et al. |
| 8,183,077 B2 | 5/2012 | Vaganov et al. |
| 8,316,725 B2 * | 11/2012 | Wade ............... 73/862.627 |
| 8,327,715 B2 * | 12/2012 | Bradley et al. ............... 73/774 |
| 8,350,345 B2 * | 1/2013 | Vaganov ............... 257/415 |
| 2009/0263062 A1 | 10/2009 | Smith et al. |
| 2011/0000318 A1 | 1/2011 | Bradley et al. |
| 2012/0152037 A1 | 6/2012 | Wade |

FOREIGN PATENT DOCUMENTS

| | | |
|---|---|---|
| EP | 1519173 A1 | 3/2005 |
| EP | 1348110 B1 | 5/2005 |
| EP | 2110569 A1 | 10/2009 |
| JP | 63196080 A | 8/1988 |
| WO | WO 9919704 A1 | 4/1999 |
| WO | WO 0135066 A1 | 5/2001 |
| WO | WO 0165232 A1 | 9/2001 |
| WO | WO 02103369 A1 | 12/2002 |
| WO | WO 2005038422 A1 | 4/2005 |
| WO | WO 2007127738 A2 | 11/2007 |
| WO | WO 2010048040 | 4/2010 |

OTHER PUBLICATIONS http://www.gesilicones.com/siliconesweb/am1/en/documentsdatasheets;1838.html, "Momentive Performance Materials," 5 pages, printed Nov. 19, 2008.

Honeywell, "Airflow, Force, and Pressure Sensors, Product Range Guide," 20 pages, Nov. 2010.

Honeywell, "Force Sensors Line Guide," 4 pages, Jun. 2009.

Honeywell, "Pressure, Airflow, Force", Sensing and Control, pp. 1-10, 2003.

Honeywell, "Pressure Sensors FS01/FS03 Force Sensors," 4 pages, 2003.

Honeywell, "TruStability Silicon Pressure Sensors: HSC Series-High Accuracy," 12 pages, Jul. 2010.

Honeywell, "TruStability Silicon Pressure Sensors: SSC Series-Standard Accuracy," 12 pages, Jul. 2010.

* cited by examiner

FORCE SENSOR

TECHNICAL FIELD

The present disclosure relates generally to sensors, and more particularly, to force sensors for sensing a force applied to the sensors.

BACKGROUND

Force sensors are often used to sense an external force applied to the sensors and provide an output signal representative of the applied force. Such sensors can be used in a wide variety of applications, including medical applications. Example medical applications include use in medical equipment in control of, for example, kidney dialysis machines, drug delivery systems, hematology equipment, infusion pumps, entrial feeders, ventilation equipment, as well as other medical equipment. Force sensors are also commonly used in non-medical applications, such as industrial applications, military applications as well as other applications.

SUMMARY

The present disclosure relates generally to sensors, and more particularly, to force sensors for sensing a force applied to the sensors. In one illustrative embodiment, a force sensor may include a sense die, and an actuation assembly for transmitting an external force to the sense die. The sense die may include a diaphragm, a boss extending from the diaphragm, and one or more sensing elements (e.g., piezoresistive elements) positioned on the diaphragm. The actuation assembly may include a force receiving feature in contact with the boss, where the boss may extend from the sense diaphragm. The actuator assembly may be configured to transmit a force applied to the force receiving feature to the diaphragm via contact with the boss. When so provided, the boss may result in an area on the diaphragm that has increased rigidity and/or durability relative to the other parts of the diaphragm, which may prove useful when receiving a force from the force receiving feature of the force sensor. In some cases, the boss may be configured to receive the force receiving feature so as to substantially center the force receiving feature with respect to the sense diaphragm, but this is not required.

An illustrative method of preparing a force sensor may include providing a force sensor having a sense die for sensing external force applied to the force sensor, where the sense die may have a sense diaphragm with a boss extending from the sense diaphragm. The method may include applying a media pressure to the sense diaphragm, where the sense die may be calibrated using the applied media pressure. Illustratively, once the sense die has been calibrated, the method may include providing the calibrated sense die and a force receiving feature in a force sensor housing, such that the force receiving feature engages and is able to transmit an external force from external to the force sensor housing to the boss. The result may be a calibrated force sensor.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION

The disclosure may be more completely understood in consideration of the following description of various illustrative embodiments of the disclosure in connection with the accompanying drawings, in which.

Figure 1:
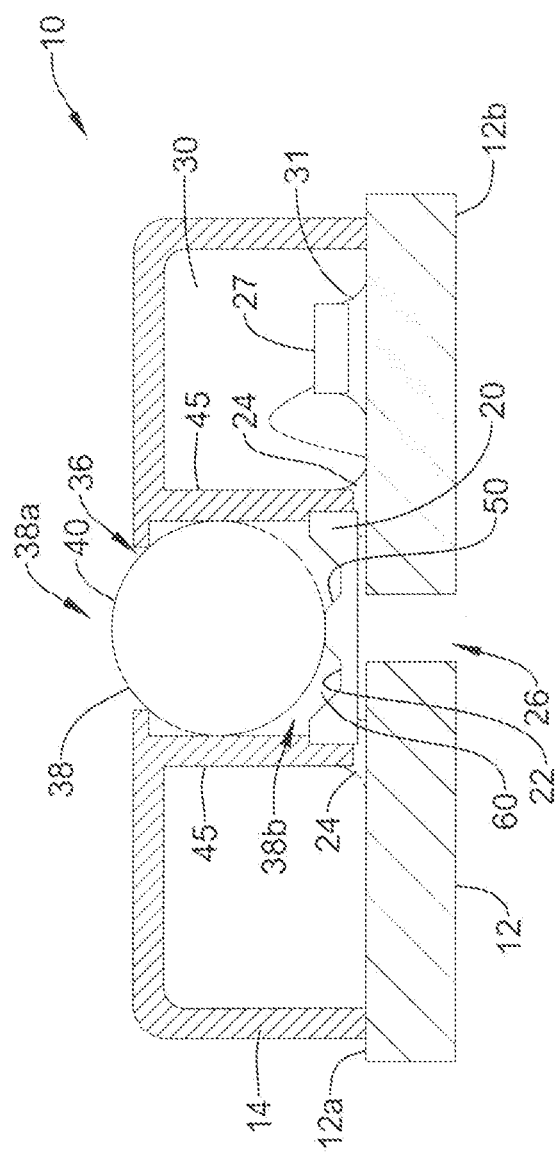
FIG. 1 is a schematic cross-sectional view of an illustrative force sensor assembly with a spherical object as a force receiving feature.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the disclosure.

Figure 2:
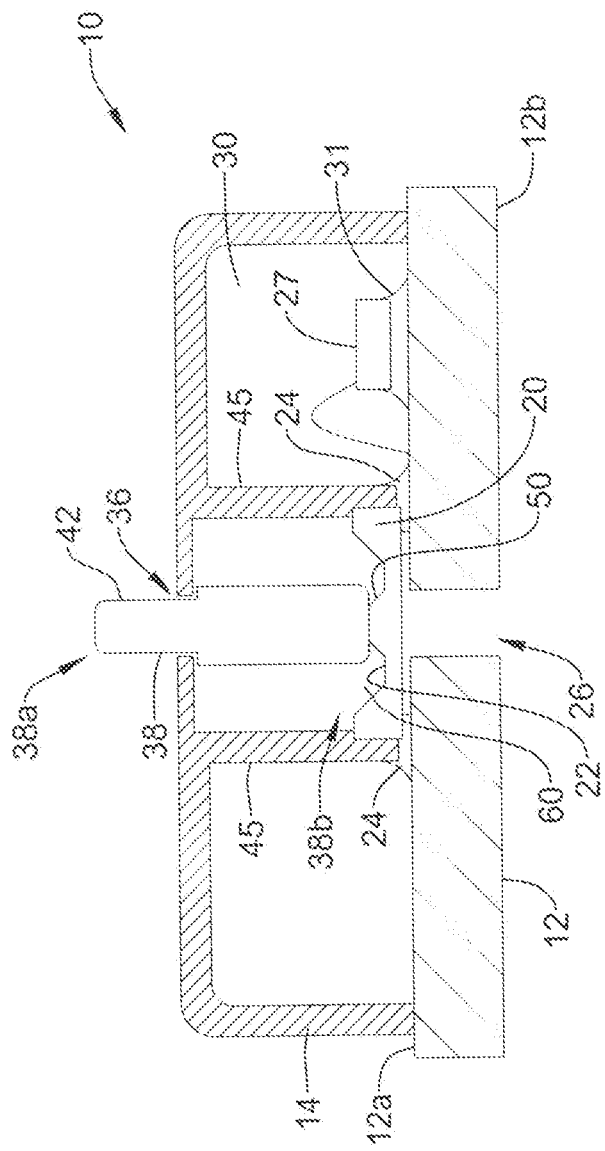
FIG. 2 is a schematic cross-sectional view of an illustrative force sensor assembly with a pin as a force receiving feature.
Figure 3:
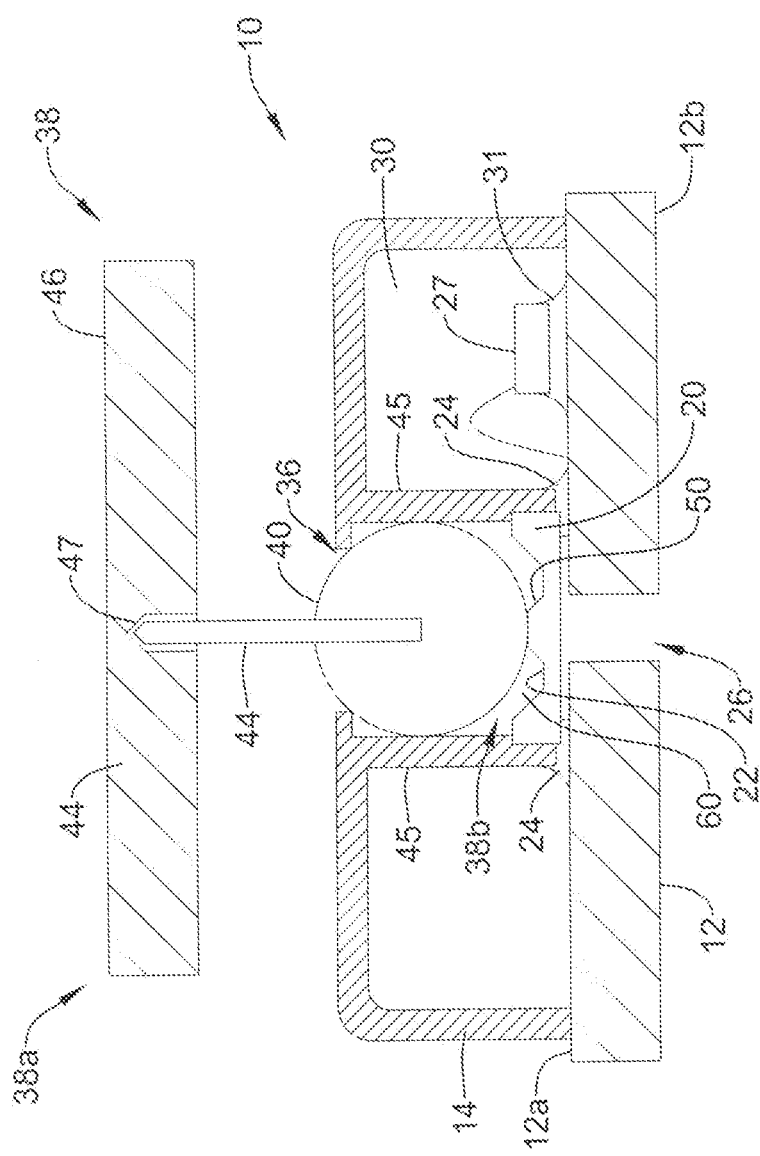
FIG. 3 is a schematic cross-sectional view of an illustrative force sensor assembly with a spherical object, a button, and an extender as a force receiving feature.
Figure 9:
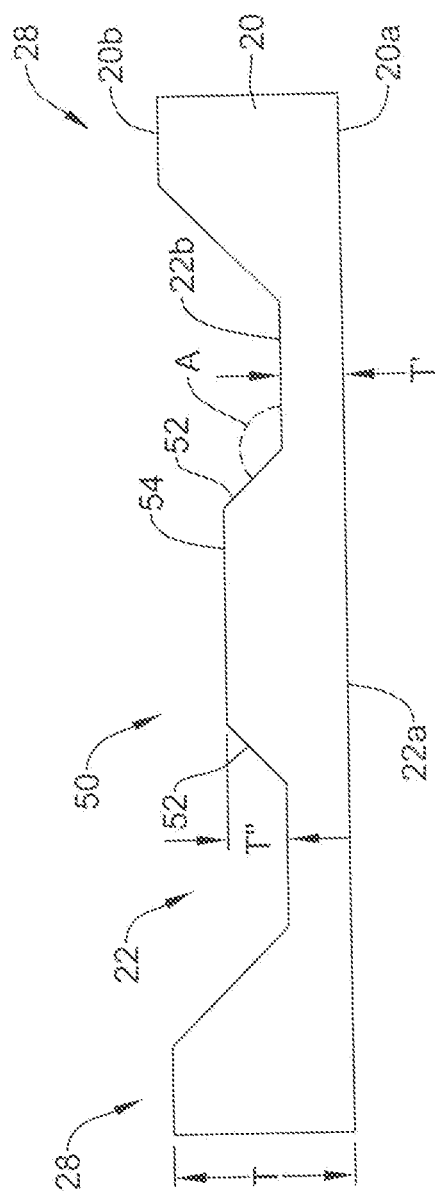
FIG. 9 is a schematic cross-sectional view of an illustrative sense die of the illustrative force sensor assemblies of FIGS. 1-3.

Illustrative force sensors are shown in FIGS. 1-3. As shown, the illustrative force sensors 10 may include a package substrate 12, an actuator assembly 38, and a sense element or sense die 20 having a diaphragm 22. The sense element or sense die 20 may have a top side 20a and a bottom side 20b (see FIG. 9), where the sense die 20 may be mounted on the package substrate 12 using an adhesive 24, solder or the like. The sense die 20 may have a height or thickness T in a peripheral region 28 (e.g., the peripheral region 28 may be the volume of sense die 20 represented by the area in FIG. 14 between the dotted rectangular perimeter and the solid line perimeter) extending around sense diaphragm 22, where the thickness T extends substantially the distance from the top side 20a to the bottom side 20b of sense die 20, as best shown in FIG. 9. In some illustrative cases, the sense die 20 may be a micromechanical sensor element fabricated using a silicon wafer and suitable fabrication techniques. The sense die 20 may have one or more sensing elements 16 in communication with sense diaphragm 22, such as piezoresistive sensing elements or components, and/or other circuitry (e.g., trim circuitry, signal conditioning circuitry, etc.) formed using suitable fabrication or printing techniques. In some cases, the sensing diaphragm 22 may have a top side 22a and a bottom side 22b, where the one or more sensing elements 16 may be formed for sensing a deflection of the sensing diaphragm 22 in response to an applied force. In some instances, the sensing diaphragm 22 may be fabricated by back-side etching a silicon die (e.g., with a KOH etching technique or other etching technique), however, it is contemplated that any suitable process may be used, as desired. The sense diaphragm 22 may have a height or thickness T' that extends substantially the distance from the top side 22a to the bottom side 22b of diaphragm 22. In some instances, the sense diaphragm thickness T' may be less than the die thickness T, as best shown in FIG. 9. In some illustrative cases, sense diaphragm 22 may include a rigid center projection or boss 50 extending from backside 22b. The projection or boss 50 may be integrally formed with sense diaphragm 22, or may be attached to sense diaphragm 22 after forming sense diaphragm 22.

Figure 14:
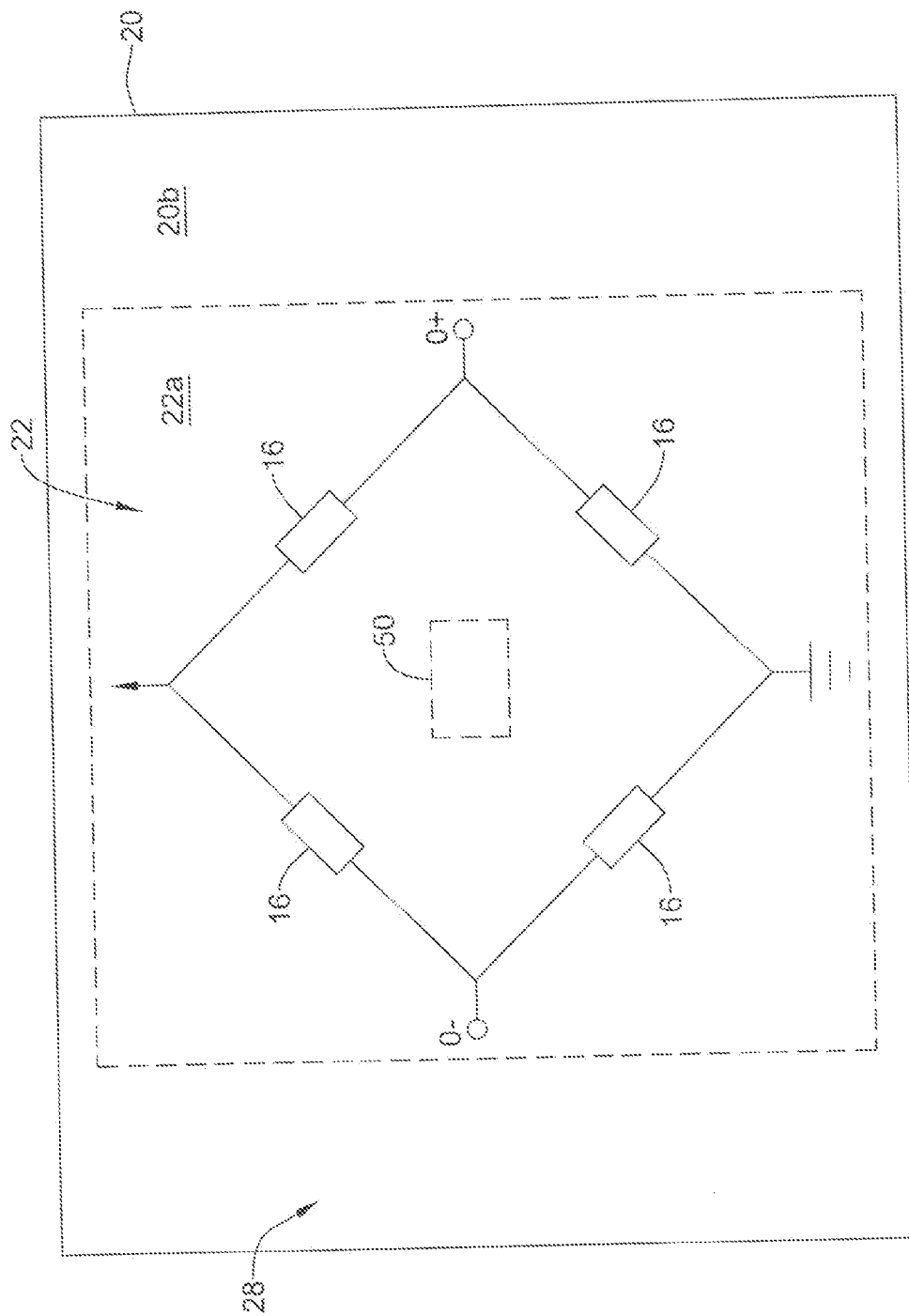
FIG. 14 is a schematic top-side view of the illustrative sense die of FIG. 9.

When utilized, the piezoresistive components may be secured relative to the sense diaphragm 22 and optionally laterally spaced from boss 50, as best seen in FIG. 14, where the piezoresistive components may be configured to have an electrical resistance that varies according to an applied mechanical stress (e.g., deflection of sensing diaphragm 22). In some cases, the piezoresistive components may include a silicon piezoresistive material; however, it is contemplated that non-silicon materials may be used, as desired. The piezoresistive components may be connected in a Wheatstone bridge configuration (e.g., a full or half bridge configuration). It is to be understood that the piezoresistive components are only one example of a sensing element that can be used, and it is contemplated that any other suitable sensing elements may be used, as desired.

In an illustrative instance, and when so provided, the package substrate 12 having a first side 12a and a second side 12b, may include a ceramic material, however, it is contemplated that other suitable materials may be used as desired (e.g., a printed circuit board (PCB)). In some cases, the sense die 20 may be mounted to the substrate 12 using an adhesive 24 such as a silicone, RTV, a silicone-epoxy, a soft epoxy, or a regular or hard epoxy. The adhesive 24 may include a conductive adhesive, a nonconductive adhesive, or a combination of conductive and nonconductive adhesives. Any suitable conductive adhesive and nonconductive adhesive may be used. One example nonconductive adhesive is RTV6424, which is available from Momentive Performance Materials Inc. of Waterford, N.Y. One example conductive adhesive may be SDC5000, which is available from Momentive Performance Materials Inc. of Waterford, N.Y. These are just examples, and it is contemplated that any other suitable conductive and/or nonconductive adhesive may be used, as desired. When provided, the combination of conductive and nonconductive adhesives may be provided in a pattern to electrically connect bond pads (not shown) of the sense die 20 to bond pads (not shown) on the substrate 12. In any event, it is contemplated that the sense die 20 may be mounted to the substrate 12 using any other suitable bonding mechanism (e.g., solder, eutectic, ball-grid array (BGA), etc.).

As shown in FIGS. 1-3, the sense die 20 may be directly mounted to the substrate 12 using adhesive 24 with no intervening isolation layer(s) or substrate provided therebetween, but this is not required. In some instances, an isolation layer or glass substrate or other layer (not shown) may be provided in force sensor 10 between the sense die 20 and the substrate 12, if desired. The sense die 20 and package substrate 12 may be made of any suitable material(s), as desired. For example, the sense die 20 may include a silicon material and the package substrate 12 may include an alumina ceramic, which may have similar temperature expansion coefficients.

In some cases, the sense die 20 may be mounted over an opening 26 in the package substrate 12 that is sized to expose the sensing diaphragm 22 to the second side 12b of the package substrate 12, but this is not required. In this instance, the back side of force sensor 10 (e.g., the back side of force sensor 10 may be facing the package substrate 12) may have a reference pressure that can be transmitted to the sensing diaphragm 22 via opening 26.

In the illustrative instances depicted in FIGS. 1-3, the sense die 20 may be flip chip mounted to substrate 12, using adhesive 24 as a bonding material. In other words, the top side 20a of the sense die 20 (e.g., the side of the sense die 20 with the sensing elements 16) is shown facing downward (e.g., "downward" is with respect to the orientation shown in FIGS. 1-3) toward a first side 12a (e.g., "top side" is with respect to the orientation shown in FIGS. 1-3) of substrate 12, and mounted thereto with adhesive 24. In this example, the adhesive 24 may be configured to electrically connect bond pads (not shown) on the sense die 20 to one or more bond pads or trace conductors on the substrate 12 without the need for wire bonds, if desired. In addition, or in the alternative, the sense die 20 may be flip chip mounted to the substrate 12 using bump bonds, a solder ball grid array (BGA), or any other suitable technique, as desired. In some cases, it is contemplated that the back side 20b of the sense die 20 (e.g., the side of the sense die 20 through which the diaphragm 22 is formed) may be mounted to the substrate 12 with adhesive 24. In some instance, wire bonds (not shown) may be provided to electrically connect bond pads on the top side 20a of the sense die 20 to bond pads on the substrate 12, if desired.

Figure 4:
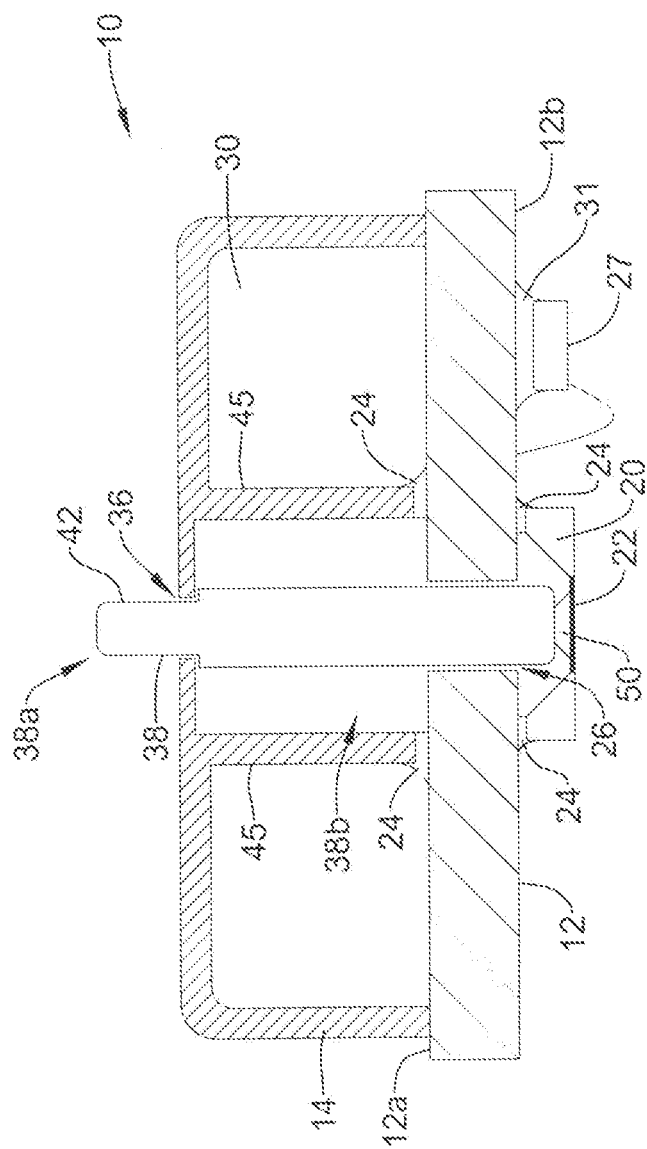
FIG. 4 is a schematic cross-sectional view of an illustrative force sensor assembly with a pin as a force receiving feature extending through a substrate to a sense die having a second side connected to a second side of the substrate.
Figure 5:
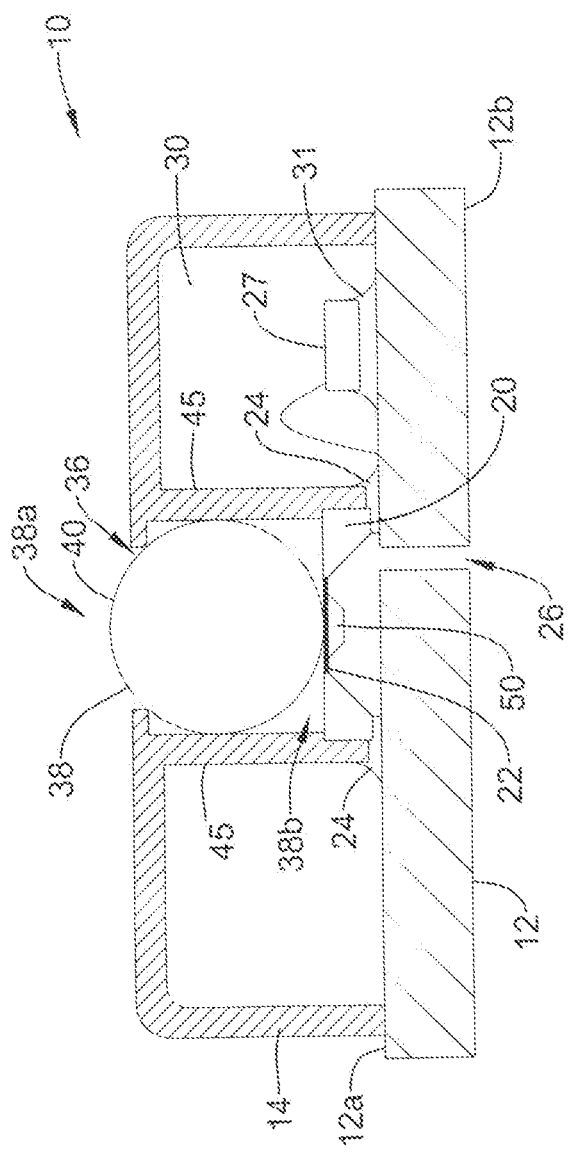
FIG. 5 is a schematic cross-sectional view of an illustrative force sensor assembly with a spherical object as a force receiving feature contacting a top side of a sense die.

In some instances where the back side 20b of the sense die 20 is mounted to the package substrate 12, the back side 20b may be mounted to the bottom side 12b of the package substrate 12, as shown in FIG. 4. In these instances, opening 26 may be sized to allow the spherical object 40, pin 42, extender 44, and/or any other force transferring means to extend through the substrate 12 and abut and/or be positioned adjacent the back side 22b of the sensing diaphragm 22. When the sense die 20 is positioned on the bottom side 12b of the package substrate 12, the signal conditioning circuitry 27 may also be mounted to the bottom side 12b of the package substrate 12 (as shown in FIG. 4) and/or the signal condition circuitry 27, if provided, may be positioned on the top side 12a of the package substrate 12 (not shown). In some instances, a housing or cover (not shown) may be mounted on the bottom side 12b of the package substrate to protect wire bonds, signal conditioning circuitry 27, sensing diaphragm 22 and other electrical and non-electrical components of force sensor 10 and for other similar or different purposes. Alternatively, or in addition, the back side 20b of the sense die 20 may be mounted to the top side 12a of the package substrate 12, as shown in FIG. 5. Where the back side 20b of the sense die 20 is mounted to the top side 12a of the package substrate 12, opening 26 may be sized and positioned to allow pressure relief from a space between the sensing diaphragm 22 and the substrate 12 upon deflection of the sensing diaphragm 22 in response to a force applied to a force receiving feature 38, such as the spherical object 40, the pin 42, the button 46, and/or other force receiving feature(s) 38. In some cases, the sense die 20 may be positioned and/or sized with respect to sense 20 in any other manner, as desired.

In some cases, the sense diaphragm 22 of sense die 20 may include one or more projections or bosses 50 extending from the bottom side 22b of the sense diaphragm 22. The boss 50 may have any shape configured to, for example, reduce wear to diaphragm 22 due to movement of a force receiving feature 38 when it contacts diaphragm 22, allow for higher force and higher pressure applications, and/or facilitate a linear relationship between a force applied to the boss 50 and an output of sense elements 16.

In some instances, the boss 50 may have one or more side walls 52 and a bottom side 54, where the side walls 52 may extend at least partially from the bottom side 22b of sense diaphragm 22 to the bottom side 54 of boss 50. The boss 50 may be position so as to be situated between the bottom side 22b of the sense diaphragm 22 and the bottom side 20b of the sense die 20, as best shown in FIG. 9, or boss 50 may be situated in any other position, as desired. A thickness and/or height T" of boss 50 may be a distance from the bottom side 22b of diaphragm 22 to the bottom side 54 of boss 50. In some cases, thickness T" of boss 50 may be such that boss thickness T" and diaphragm thickness T', when combined, are less than (but sometimes relatively close to) sense die thickness T (e.g., boss thickness T" and diaphragm thickness T' may be combined to be relatively close to sense die thickness T if the combined thickness is at least half, three-quarters, etc. of the sense die thickness T), which may facilitate force sensor 10 operating at low force ranges.

Figure 6:
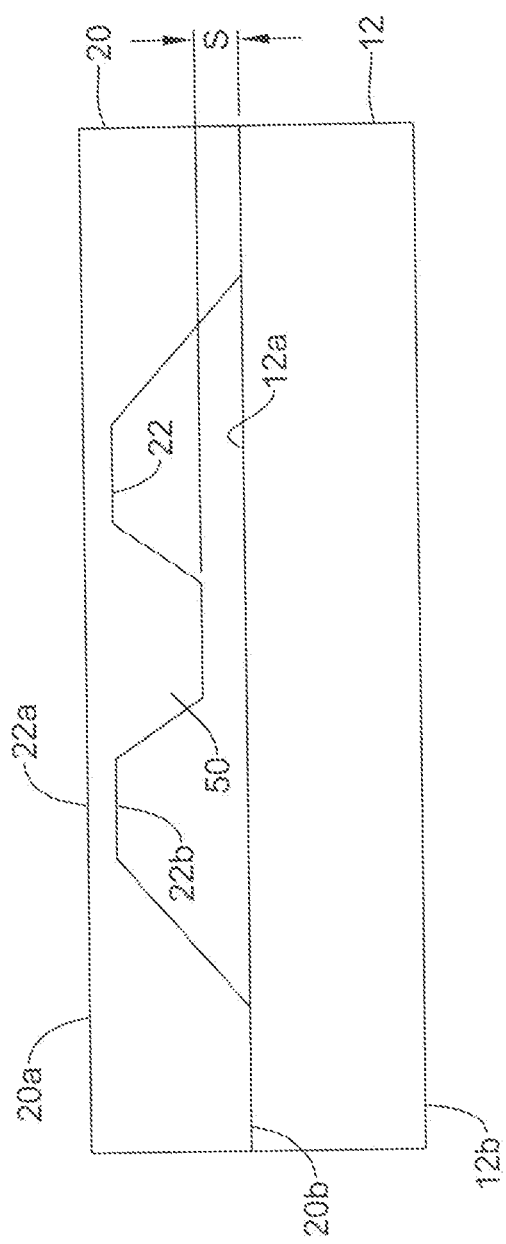
FIG. 6 is a schematic cross-sectional view of an illustrative sensor assembly including a sense die having a boss configured for over deflection protection.
Figure 7:
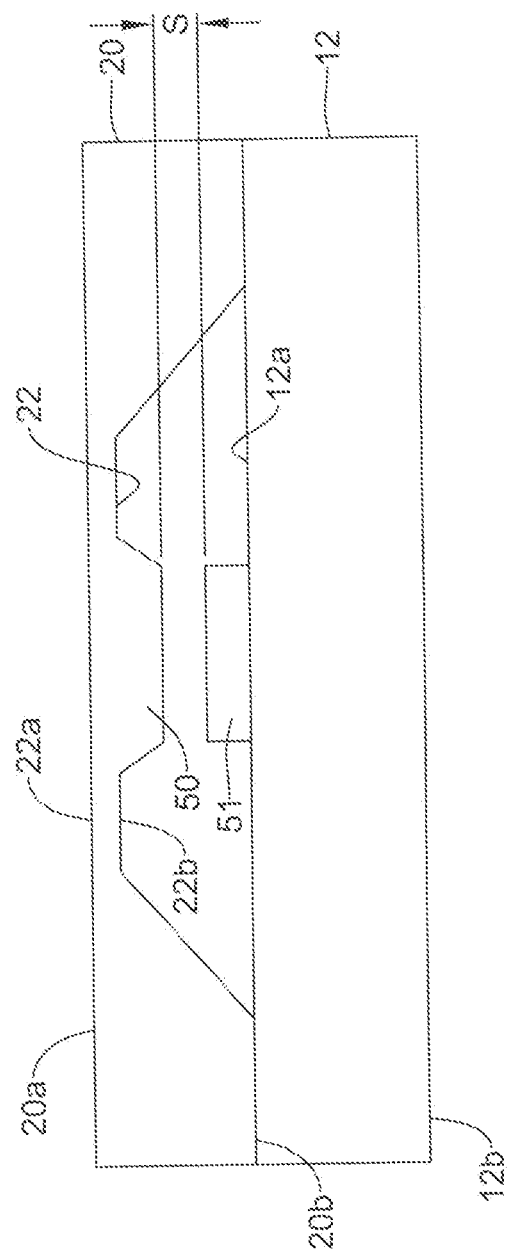
FIG. 7 is a schematic cross-sectional view of an illustrative sensor assembly including a sense die having a boss and a substrate having a boss, where the bosses are for over deflection protection.
Figure 8:
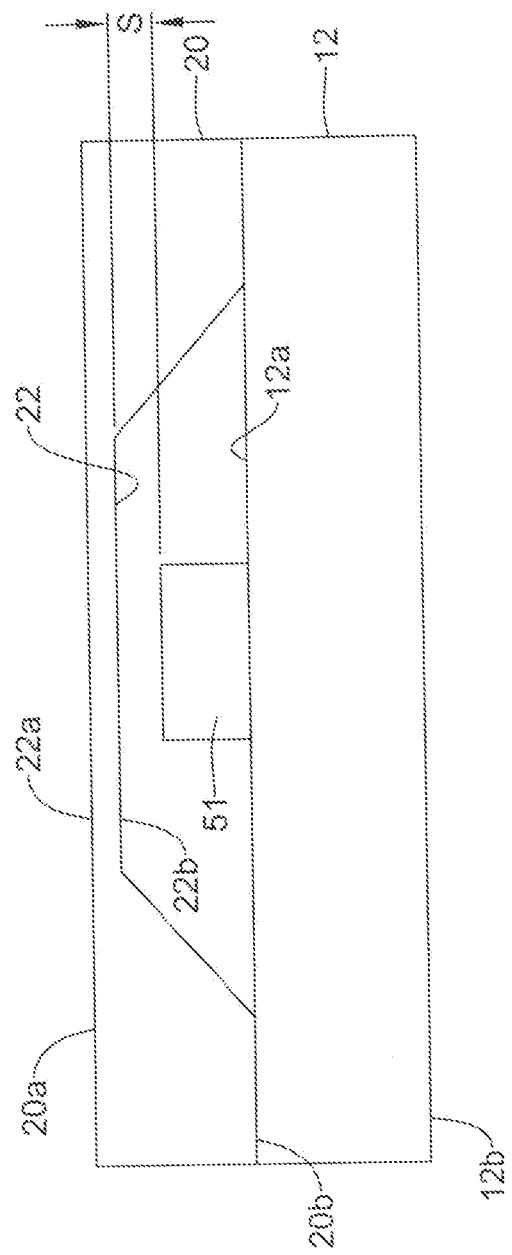
FIG. 8 is a schematic cross-sectional view of an illustrative sensor assembly including a substrate having a boss for over deflection protection.

It is contemplated that boss 50 may be positioned at any location on sense diaphragm 22. For example, boss 50 may be substantially centered with respect to the sense diaphragm 22 or may be positioned at any other location on sense diaphragm 22. In some instances, the size, shape, and positioning of boss 50 may prevent or work to negate the effects of drilling (e.g., drilling may be when the force receiving feature 38 rubs against diaphragm 22 and creates a degenerative environment), and in some cases, may allow for over pressure/force protection by providing increased diaphragm 22 stability and preventing over deflection of diaphragm 22 (e.g., boss 50 may act as a stopper and may have other similar and dissimilar affects). The boss 50 and, in some cases, a package substrate boss 51 (e.g., where the package substrate boss 51 may have similar or dissimilar characteristics to boss 50) may prevent over deflection of sensing diaphragm 22 by preventing diaphragm 22 from deflecting more than a distance S (e.g., the distance S may be a distance less than a distance causing the sensing diaphragm 22 to have permanent deformation), as seen in FIGS. 6-8. For example, over deflection of the sensing diaphragm 22 may be prevented by positioning the boss 50 extending from the bottom side 22b of the sensing diaphragm 22 to contact a top side 12a of the package substrate 12 after traveling a distance S (as shown in FIG. 6), by positioning the boss 50 extending from the bottom side 22b of the sensing diaphragm 22 to contact a package substrate boss 51 extending from the top side 12a of the package substrate 12 after traveling a distance S (as shown in FIG. 7), and/or by positioning the boss 50 extending from the bottom side 22b of the sensing diaphragm 22 in any other manner. In some cases, the sensing diaphragm 22 may not include a boss 50 extending therefrom (as shown in FIG. 8), rather the package substrate boss 51 may be sized to allow the bottom side 22b of the sensing die 22 to travel a distance S before abutting the package substrate 51 to prevent over deflection of the sensing diaphragm 22 due to sensed high forces and/or pressures.

In an alternative to, or in addition to, being used in a force sensor 10, a sense die 20 having diaphragm 22 with a boss 50 may be used in other types of sensors, including, but not limited to, pressure sensors such as an absolute pressure sensor, gauge pressure sensors, or other pressure sensors. Example sensors and sense elements may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2010/00184324; 2007/0095144; and 2003/0167851, all of which are hereby incorporated by reference.

Boss 50, extending from diaphragm 22 may be formed in any manner. For example, boss 50 may be integrally formed with diaphragm 22 through an etching technique (e.g., KOH etching with a 54.7 or 144.7 degree etch angle) or other forming technique. In another illustrative example, boss 50 may be attached or connected to diaphragm 22 through a bonding or other connection technique. The bonding or connection of boss 50 to diaphragm 22 may be achieved by using a suitable adhesive or any other suitable bonding mechanism (e.g., solder, eutectic, fusion bonding, anodic bonding, etc.), where the attached boss 50 may be of a material substantially the same as diaphragm 22 or a different material, as desired.

Figure 10:
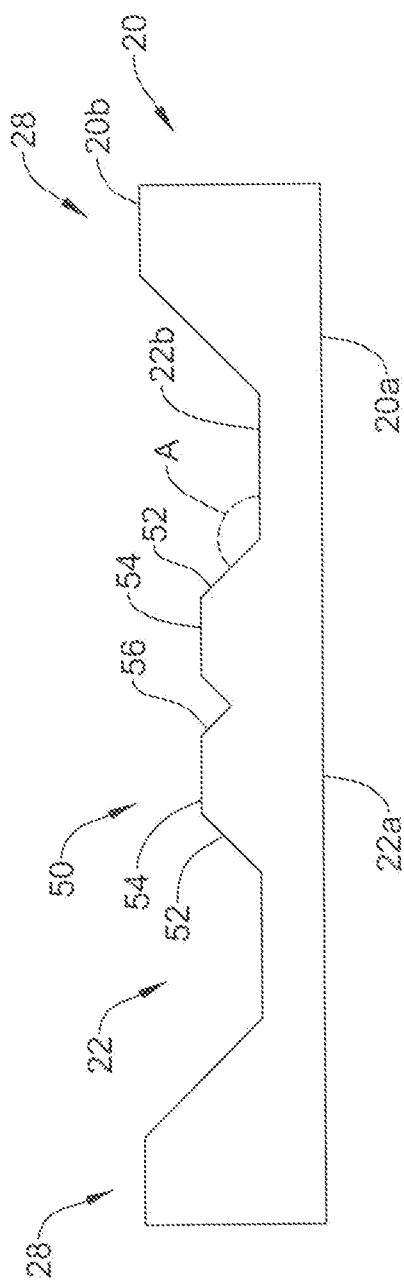
FIG. 10 is a schematic cross-sectional view of the illustrative sense die of FIG. 9, where the illustrative sense die further includes a capture feature with a V-shaped cross-section.
Figure 11:
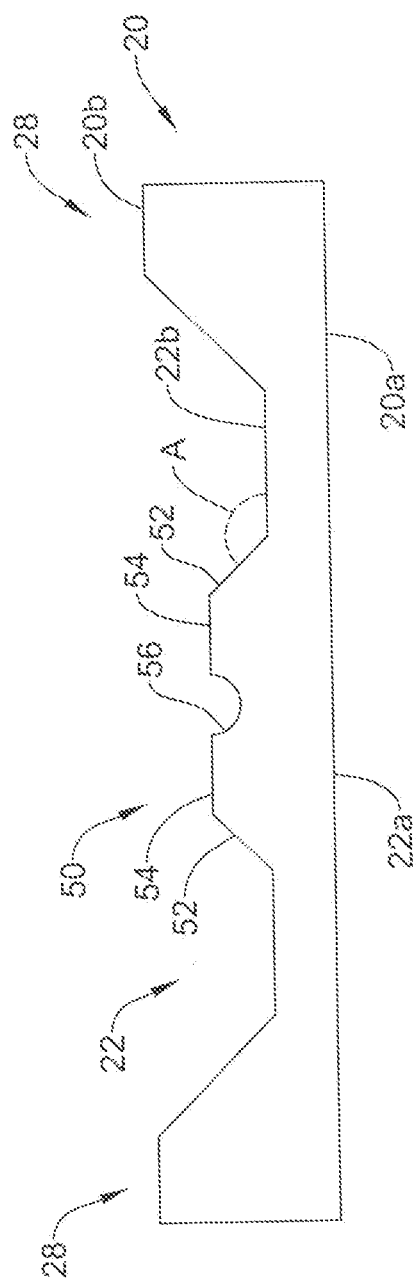
FIG. 11 is a schematic cross-sectional view of the illustrative sense die of FIG. 9, where the illustrative sense die has a capture feature with a circular-shaped cross-section.
Figure 12:
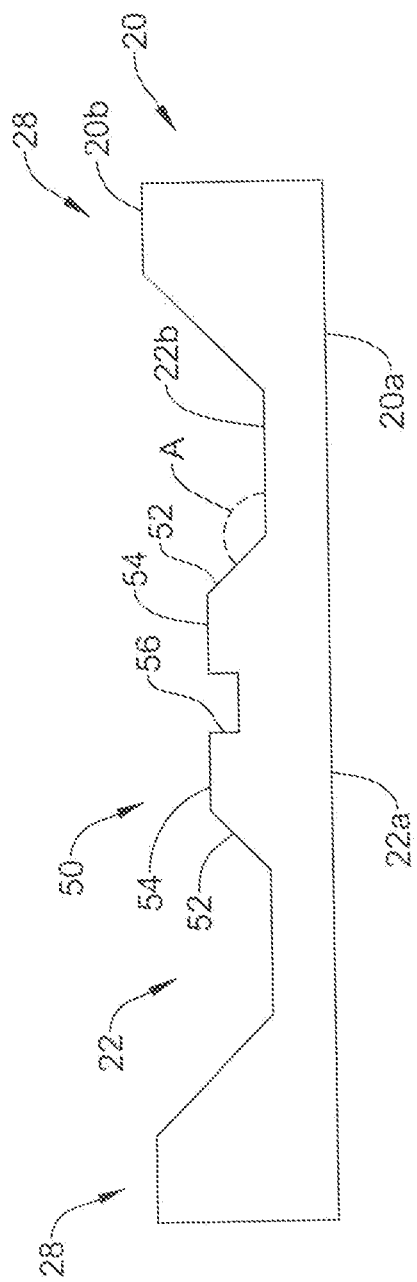
FIG. 12 is a schematic cross-sectional view of the illustrative sense die of FIG. 9, where the illustrative sense die has a capture feature with a U-shaped cross-section.
Figure 13:
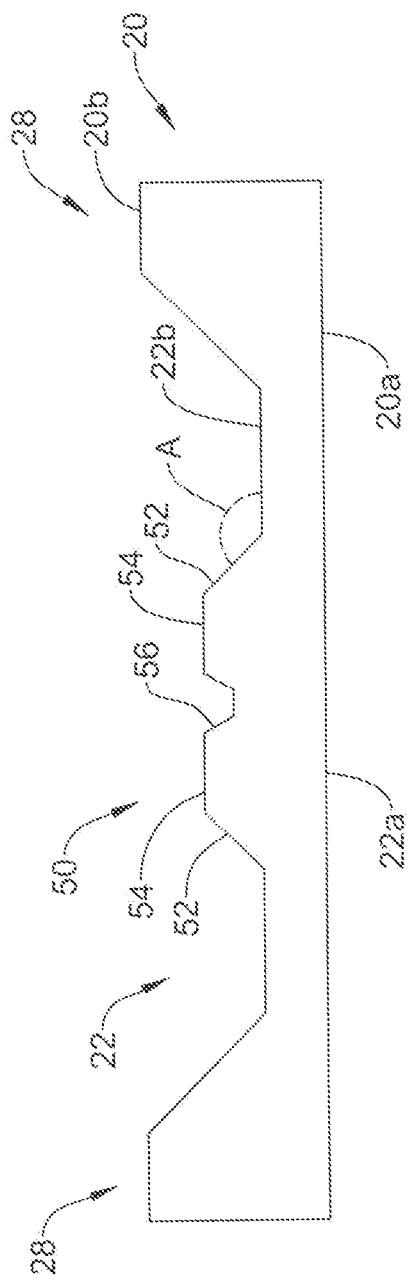
FIG. 13 is a schematic cross-sectional view of the illustrative sense die of FIG. 9, where the illustrative sense die has a capture feature with a flat bottom and walls tapering toward the flat bottom.

As shown in FIG. 10, the bottom side 54 of projection or boss 50 may include a capture feature 56. Capture feature 56 may be positioned so as to extend from the bottom side 54 of boss 50 inwards towards the bottom side 22b of sense diaphragm 22. The capture feature 56 may be positioned at any position on the bottom side 54 of boss 50. For example, capture feature 56 may be substantially centered relative to the boss 50, or may be positioned at any other location on bottom side 54 of the boss 50, as desired. The capture feature 56 may take on any shape configured to receive a second side 38b of a force receiving feature 38 of the actuator assembly. For example, the capture feature 56 may be an indent or hole opening at the bottom side 54 of boss 50 and may extend toward bottom side 22b of diaphragm 22. When so provided, the capture feature 56 may facilitate centering and/or proportionately positioning the received one or more force receiving feature 38 with respect to the bottom side 22b of sense diaphragm 22. Alternatively, or in addition, capture feature 56 may extend from bottom side 54 of boss 50 and away from the bottom side 22b of diaphragm 22. For example, capture feature 56 may include a ring or rim extending at least partially away from diaphragm 22. In some cases, capture feature 56 may be at least partially cone-shaped (FIG. 10), may taper towards bottom side 22 of diaphragm 22 and have a flat bottom (FIG. 13), may be at least partially spherically shaped (FIG. 11), may have at least a partial rectangular shape (FIG. 12), may have at least a partial pyramid shape (FIG. 10), and/or may take on any other suitable shape as desired.

As shown in FIGS. 9-13, in some cases, the side walls 52 of boss 50 may form an angle "A" with respect to the bottom side 22b of sense diaphragm 22. The angle "A" between side walls 52 and bottom side 22b of diaphragm 22 may be any angle. For example, the angle A between side walls 52 and bottoms side 22 may be any angle less than or equal to ninety degrees, any angle greater than or equal to ninety degrees, any angle equal to or greater than one hundred twenty degrees, any angle equal to or greater than 144.7 degrees and any other similar or dissimilar angles, as desired.

In some cases, force sensor 10 may include an actuation assembly for transmitting an external force to the sense die 20. As seen in FIGS. 1-3, the actuation assembly may include a force receiving feature 38 to be received by boss 50 and/or at indent 56. In some cases, the force receiving feature may include a spherical object 40 (FIG. 1), a pin 42 (FIG. 2), an extender 44 (FIG. 3), a button 46 (FIG. 3), any other activation device, and/or a combination thereof. Illustratively, pin 42 (FIG. 2) and/or extender 44 (FIG. 3) may have an end that is at least partially tapered, where the tapered portion of the end may contact at least a portion of an inner circumference of a hole in button 46. It may be appreciated that other types of actuators may be utilized such as, for example, slidable mounted plungers or shafts, point of contact type components other than spherical objects, "T" shaped transfer mechanisms, in accordance with alternative embodiments. If desired, only part of the outside surface of the object 40 may be spherical in shape or take on a particular shape. The force receiving feature may be made of any material. For example, the force receiving feature 38 may include stainless steel, other suitable metal and/or other suitable material. In some cases, the force receiving feature may include a stainless steel ball bearing. It is contemplated, however, that other generally spherical and other shaped elements may be used as or as part of the force receiving feature 38, if desired, including polymer based objects.

As shown in FIGS. 1-3, the force receiving feature 38 may have a first side 38*a* for receiving an external force and a second side 38*b* for transferring the external force or a portion thereof to diaphragm 22 through making intimate contact with and transmitting the portion of the external force to the bottom side 54 of boss 50 in response to receiving the external force. In some cases, where force receiving feature 38 has first side 38*a* and second side 38*b*, the second side 38*b* may be in contact with the back side 54 of projection or boss 50 extending from the sensing diaphragm 22. The pin 42 (as shown in FIG. 2) and/or extender 44 (as shown in FIG. 3) may be configured to include a length extending at least partially between first side 38*a* and second side 38*b*, where second side 38*b* may be in contact with back side 54 of projection or boss 50 and/or extender 44 may be in contact with an object (e.g., a bearing or spherical object 40, as shown in FIG. 3) that may, in turn, be in contact with boss 50.

In some illustrative instances, a protective cover or housing 14 may be provided. The protective housing 14 may define a cavity 60 for housing sense die 20. As illustrated, the protective housing 14 is disposed on first side 12*a* of substrate 12. In such a configuration, the protective housing 14 may help protect the sensing element of sense die 20. In some cases, the protective housing 14 may be formed from, for example, plastic, ployamide, ceramic, metal or another suitable material. Although not shown, it is contemplated that a bottom protective housing may be provided on the second side 12*b* of the substrate 12. When so provided, the bottom protective housing may define a cavity that may include a reference pressure for the sensing diaphragm, or may include a pressure opening for exposing the sensing diaphragm 22 to a second input pressure, atmosphere or other pressure as desired. In some cases, two or more protective housings 14 may be attached to the substrate 12 with the same or substantially the same "footprint" on each side of the substrate 12, but this is not required.

When provided, the protective housing 14 may be configured to include an opening 36 for receiving force receiving feature 38, and an inward protrusion body 45 defining a chamber for holding the actuating assembly, namely the force receiving feature 38, in place. As shown in FIGS. 1-3, body 45 may be formed as part of the protective housing 14. However, when provided, it may be separately formed and affixed to the housing 14 or configured to abut housing 14. In some cases, body 45 may be precisely formed with respect to the dimensions of the force receiving feature 38 (e.g., the dimensions of spherical object 40, pin 42, extender 44, button 46, etc.) so as to maintain a relatively constant point of contact between the force receiving feature 38 and the sensing diaphragm 22. Although not necessary, the body 45 may extend all the way down to the substrate 12 to help isolate the sense die 20. When body 45 does extend all the way down to substrate 12, it may be optionally affixed to sense die 20 and or substrate 12, as desired. In the illustrative instances seen in FIGS. 1-3, the protective housing may be attached or connected to the package substrate 12 (and/or sensing element/die 20) using a suitable adhesive or any other suitable bonding mechanism (e.g., solder, eutectic, etc.). As shown in FIGS. 1-3, the protective housing 14 may define opening 36, which may provide access to the sense die 20 from the environment external to the protective housing 14. The opening 36 may be sized to accommodate the force receiving feature 38, and to maintain the force receiving feature 38 in a generally upright orientation (e.g., "upright" may be with respect to the orientation shown in FIGS. 1-3).

Although not shown, the force sensor 10 may include one or more electrical leads on the substrate 12 that can be electrically connected to the sense die 20 for receiving one or more signals corresponding to the pressure or force sensed by the sense die 20 (e.g., sensing diaphragm 22). In some cases, the one or more electrical leads may include metal, however, any suitable material may be used, as desired, such as conductive polymers.

In operation, when a current is applied to the piezoresistive sensing elements 16 (e.g., to the Wheatstone bridge configuration of the piezoresistive sensing elements, as best shown in FIG. 14), an electrical output signal may be generated that is related to the degree of deflection of the diaphragm 22, and thus the force applied to the force sensor 10. The actuation assembly may be configured to transmit the external force to the sensing diaphragm 22, which then deflects the sensing diaphragm 22 accordingly and changes the resistance of the piezoresistive sensing elements 16. In some instances, the point of contact between the sensing diaphragm 22 and force receiving feature 38 may determine to some extent the amount of electrical signal outputted, with differing points of contact producing different output signals for the same applied force. By restricting the movement of the force receiving feature 38 with body 45 of the housing and/or through the use of projection or boss 50 and/or capture feature 56, increased repeatability of the output electrical signal for a given applied external force may be achieved. The increased repeatability of the output electrical signal for a given applied external force may result in reduced error in the outputted electrical signal typically caused by the force receiving feature 38 contacting sense diaphragm 22 in an offset or missaligned manner.

In some instances, by detecting a force, the force sensor 10 may be used to determine the rate of flow of a medium through a tube. For example, the force sensor 10 of FIG. 1 may be mechanically engaged with a tube, and may sense the amount of force a medium exerts on the walls of a tube. The force sensor may output an electrical signal that corresponds to the pressure exerted by the medium, which may correlate to the rate of flow of the medium through the tube. As such, the electrical output of the force sensor 10 may be converted into a flow rate of the medium through the tube.

Force sensor 10 may optionally include signal conditioning circuitry 27, as shown in FIGS. 1-3. In instances where signal condition circuitry 27 is included in force sensor 10, the circuitry 27 may be mounted on substrate 12 (e.g., on first side 12a or second side 12b of substrate 12). As shown in FIGS. 1-3, the signal conditioning circuitry 27 may be provided on a separate die or other electronics, and may be mounted in a cavity 30 formed by protective housing/cover 14 and/or substrate 12. In some cases, the signal conditioning circuitry 27 may include a microprocessor, a microcontroller, an application specific integrated circuit ("ASIC"), and/or an application specific standard product ("ASSP"). In some cases, signal conditioning circuitry 27 may be mounted to the substrate 12 using an adhesive 31 or any other suitable bonding mechanism (e.g., solder, eutectic, etc.). As shown, signal conditioning circuitry 27 may be electrically connected to sense die 20 via trace conductors on substrate 12, and in some cases, via bond pads and/or terminals (not shown) of force sensor 10. In some cases, it is contemplated that signal conditioning circuitry 27 may be electrically connected to the sense die 20 in other ways, including direct die-to-die wire bonds, if desired.

When provided, the signal conditioning circuitry 27 may include circuitry that receives an output signal from the sense die 20, and in response may generate an output signal whose magnitude is representative of a magnitude of the force applied to the sense die 20. The signal conditioning circuitry 27 may condition the output signal of the sense die to correct for repeatable variations, such as offset, sensitivity, non-linearity, temperature effects, and/or other variations. The signal conditioning circuitry 27 may condition the output signal to compensate for temperature-dependent variations in the electrical characteristics and/or to account for a nonlinear relationship between changes in the electrical characteristic and corresponding changes in the magnitude of the force.

Figure 15:
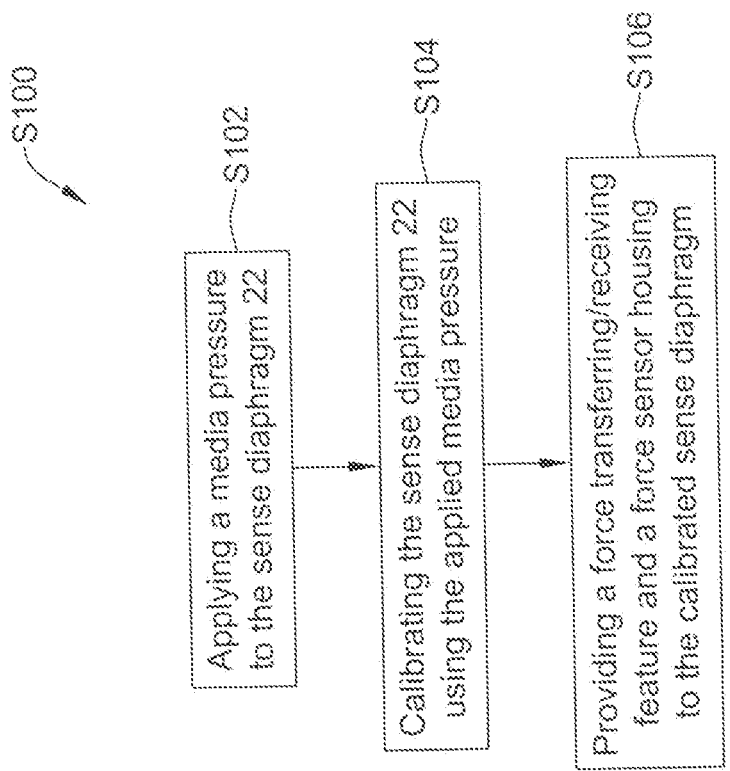
FIG. 15 is a flow diagram of an illustrative method of preparing a force sensor.

In some illustrative instances, as seen in FIG. 15, the force sensor 10 may be prepared with the method (S100) by providing a force sensor 10 with a sense die 20 for sensing a force applied externally to the force sensor 10, where the sense die 20 may have sense diaphragm 22, sometimes with a projection or boss 50 extending therefrom. In some cases, a media pressure may be applied to the sense diaphragm 22 (S102) and the sense diaphragm 22 may be calibrated using the applied media pressure (S104), which may result in a calibrated sense diaphragm 22. As such, the sense die 20 may be calibrated using an applied pressure instead of an applied force, and a force receiving feature 38 and/or a force sensor housing 14 may be added to force sensor 10 after the calibration (S106). Alternatively, or in addition, sense diaphragm 22 may be calibrated in any other manner, as desired. Once, the sense diaphragm 22 has been calibrated, the force receiving feature 38 and a force sensor housing 14 may be provided to the calibrated sense diaphragm 22 of sense die 20. The force receiving feature 38 and force sensor housing 14 may be provided to sense die 20 in any manner. For example, the force receiving feature 38 and housing 14 may be provided to the sense die 20 such that the force receiving feature 38 engages and transmit an external force from external to the force sensor housing 14 to the boss 50 of the sense diaphragm 22. In some cases, the force receiving feature 38 may be provided so as to be configured to engage an indentation or capture feature 56 in the bottom side 54 of boss 50. Where the force receiving feature 38 is provided to engage the indentation or capture feature 56, the force receiving feature 38 may be substantially centered with respect to the sense diaphragm 22 due to the indentation or capture feature 56 being provided in a substantially centered position with respect to the boss 50 and the boss 50 being provided in a substantially centered position with respect to the diaphragm 22.

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A force sensing assembly, comprising:
a housing;
a sense die situated in the housing for sensing an external force applied to the force sensing assembly, the sense die having a sense diaphragm with a top side and a bottom side, and a diaphragm thickness defined between the top side and the bottom side of the sense diaphragm, the sense die further having a peripheral region extending around the sense diaphragm that has a top side and a bottom side and a die thickness defined between the top side and the bottom side of the peripheral region, wherein the diaphragm thickness is less than the die thickness;
a boss extending from the bottom side of the sense diaphragm, the boss having a boss thickness defined between the bottom side of the sense diaphragm and a bottom side of the boss, the boss including one or more side walls extending from the bottom side of the sense diaphragm to the bottom side of the boss;
the bottom side of the boss is situated between the bottom side of the peripheral region of the sense die and the bottom side of the sense diaphragm; and
a force receiving feature accessible from external to the housing of the force sensing assembly for receiving the external force applied to the force sensing assembly, the force receiving feature configured to make intimate contact with and transmit a force to the bottom side of the boss in response to receiving the external force.

2. The force sensing assembly of claim 1, wherein the bottom side of the boss includes a capture feature for engaging the force receiving feature.

3. The force sensing assembly of claim 2, wherein the capture feature extends from the bottom side of the boss inwards towards the bottom side of the sense diaphragm.

4. The force sensing assembly of claim 2, wherein the capture feature is substantially centered with respect to the boss.

5. The force sensing assembly of claim 1, wherein the boss is substantially centered with respect to the sense diaphragm.

6. The force sensing assembly of claim 1, wherein the boss is integrally formed with the sense diaphragm.

7. The force sensing assembly of claim 1, wherein the boss is affixed to the bottom side of the sense diaphragm.

8. The force sensing assembly of claim 1, wherein each of the one or more side walls of the boss forms an angle with the bottom side of the sense diaphragm, and the angle of at least one of the one or more side walls of the boss is ninety degrees or greater with respect to the bottom side of the sense diaphragm.

9. The force sensing assembly of claim 8, wherein the angle of at least one of the one or more side walls of the boss is at least one-hundred twenty degrees with respect to the bottom side of the sense diaphragm.

10. The force sensing assembly of claim 9, wherein the angle of at least one of the one or more side walls of the boss is 144.7 degrees with respect to the bottom side of the sense diaphragm.

11. The force sensing assembly of claim 1, wherein the force receiving feature includes a ball, wherein at least part of the ball is accessible from outside of the housing.

12. The force sensing assembly of claim 1, wherein the force receiving feature includes a pin, wherein at least part of the pin is accessible from outside of the housing.

13. The force sensing assembly of claim 1, further comprising one or more piezoresistive elements secured relative to the sense diaphragm and laterally spaced relative to the boss.

14. A force sensor, comprising:
a sense die having a sense diaphragm, the sense diaphragm having a top side and a bottom side;
a projection extending from the bottom side of the sense diaphragm; and
wherein the projection includes a bottom side and one or more side walls, the one or more side walls extending from the bottom side of the sense diaphragm to the bottom side of the projection; and
wherein the bottom side of the projection includes a feature configured to receive one or more force transferring features.

15. The force sensor of claim 14, wherein the projection is substantially centered on the bottom side of the sense diaphragm.

16. The force sensor of claim 15, wherein the feature configured to receive the one or more force transferring features is substantially centered with respect to the bottom side of the projection.

17. The force sensor of claim 14, wherein the feature configured to receive the one or more force transferring features is shaped to facilitate centering the received one or more force transferring features with respect to the bottom side of the sense diaphragm.

18. The force sensor of claim 17, wherein the shape of the feature configured to receive the one or more force transferring features extends from the bottom side of the projection inward towards the bottom side of the sense diaphragm.

19. The force sensor of claim 14, wherein the projection is configured to prevent the sense diaphragm from deflecting more than a deformation distance.

20. A method of preparing a force sensor, wherein the force sensor includes a sense die for sensing an external force applied to the force sensor, the method comprising:
applying a media pressure to a sense diaphragm of the sense die, the sense diaphragm having a boss extending from the sense diaphragm;
calibrating the sense die using the media pressure, resulting in a calibrated sense die; and
providing the calibrated sense die and a force receiving feature in a force sensor housing, such that the force receiving feature engages and transmits an external force from external to the force sensor housing to the boss of the sense diaphragm.

21. The method of claim 20, further comprising:
engaging the force receiving feature with the boss on the sense diaphragm.

22. The method of claim 21, wherein the boss is substantially centered with respect to the sense diaphragm.

23. The method of claim 22, wherein the force receiving feature engages an indentation formed in the boss, wherein the indentation is substantially centered with respect to the boss.

* * * * *